UNITED STATES PATENT OFFICE.

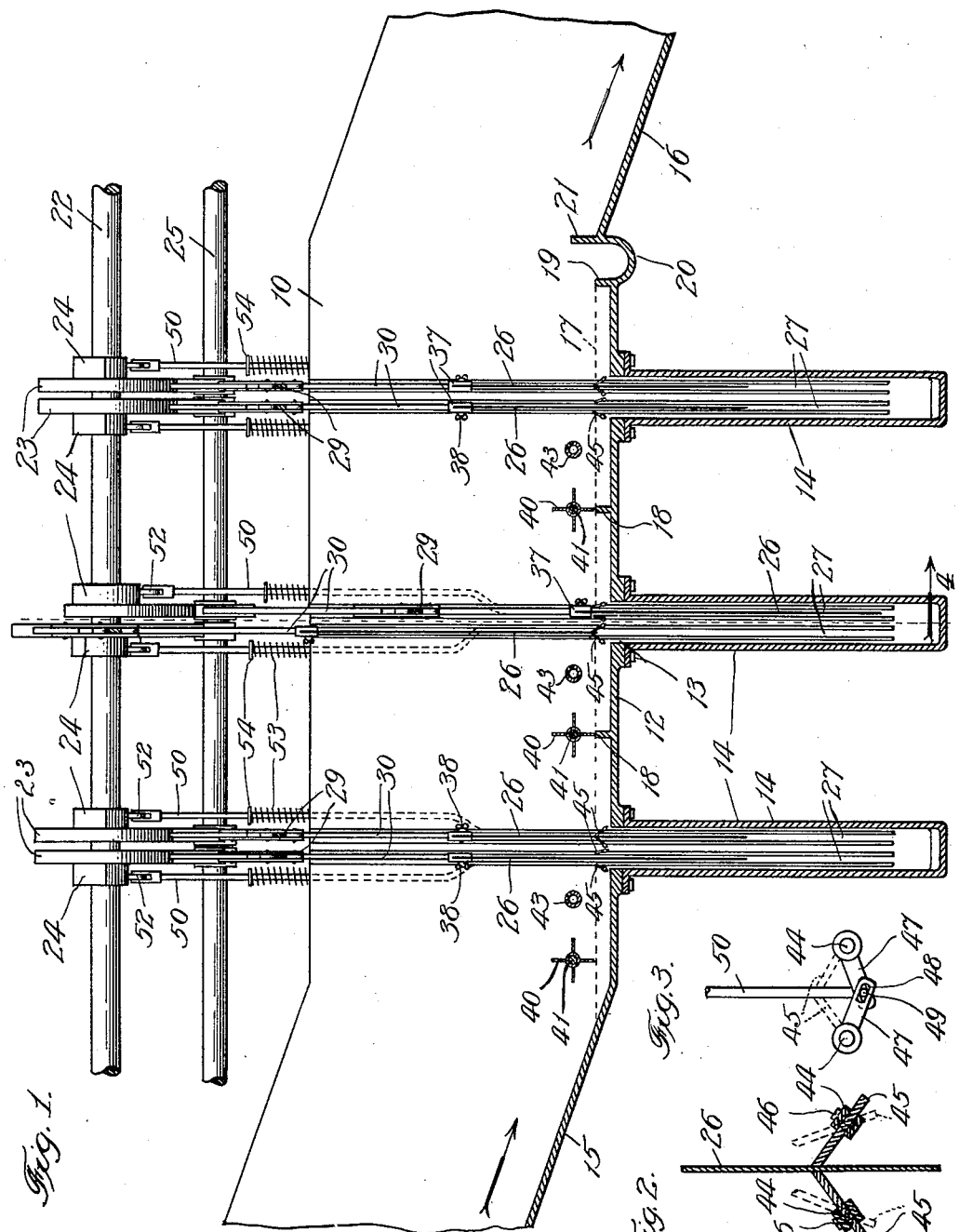

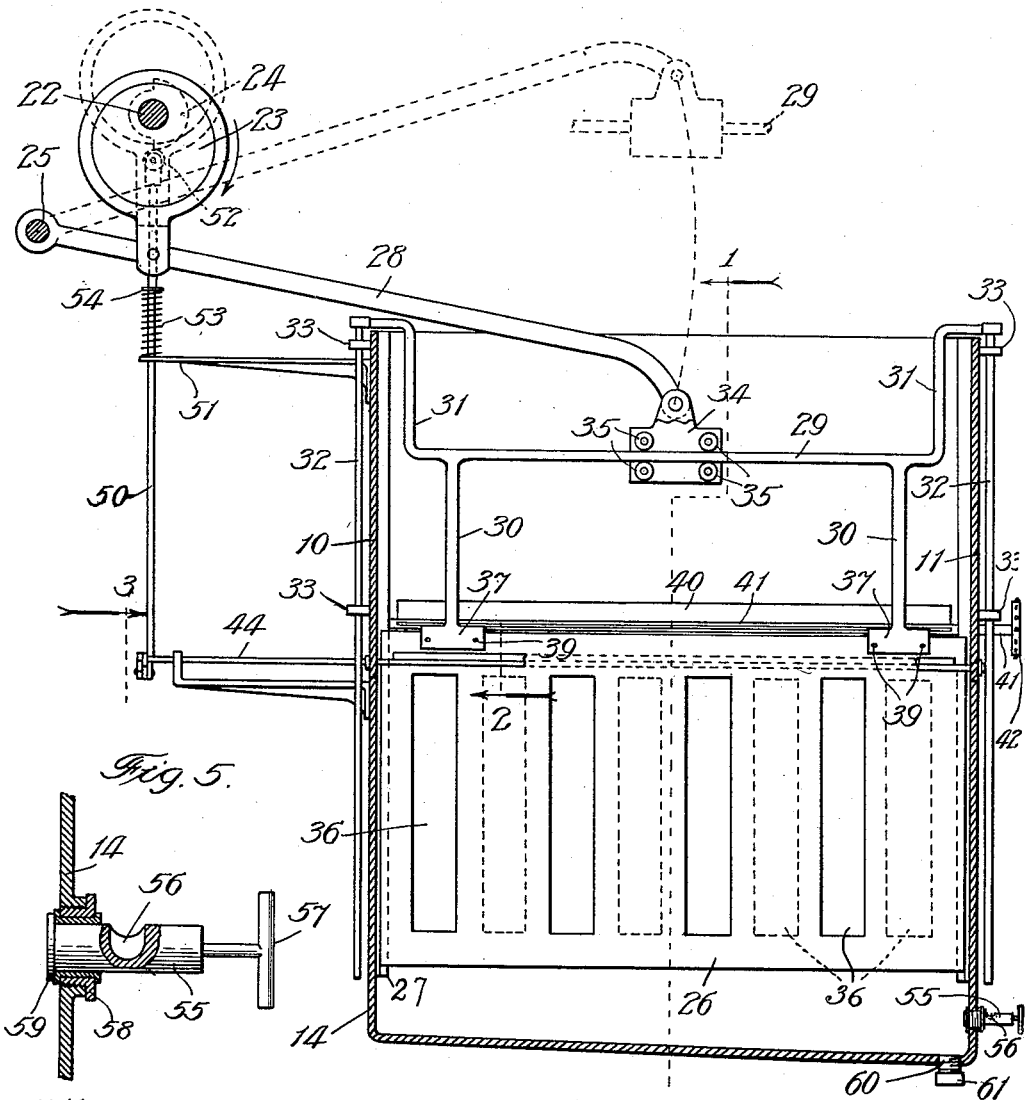

THOMAS J. LOVETT, OF CHICAGO, ILLINOIS.

AMALGAMATING APPARATUS.

1,008,044.  Specification of Letters Patent.  Patented Nov. 7, 1911.

Application filed June 23, 1911. Serial No. 634,958.

*To all whom it may concern:*

Be it known that I, THOMAS J. LOVETT, a citizen of the United States, residing at Chicago, in the county of Cook and State of Illinois, have invented a new and useful Improvement in Amalgamating Apparatus, of which the following is a specification.

My object is to provide an amalgamating apparatus of novel and improved construction adapting it for practically continuous operation and for recovering a particularly high percentage of the amalgamable values in ores, or alluvial deposits, containing material which tends to smother, scour off, or befoul the mercury coating of an amalgamating plate.

While my improved apparatus may be employed for amalgamating the values of different ores I have devised it more especially for use in recovering the values from certain extensive river-deposits which carry gold, silver and native mercury, and contain a more or less large percentage of coarse sand and also gypsum, or other calcium compound, in finely divided condition. While the only practical method known to me for recovering the values from these deposits is by amalgamation, the scouring action of the coarse sand, the befouling action of the naturally impure and unhealthy native mercury and the incrusting action of the gypsum, or the like, upon the mercury coating of the amalgamating plates, render it a matter of great difficulty, when employing an amalgamating machine of any construction hitherto provided and of which I am aware, to recover more than an unduly small percentage of the amalgamable values, passing through the machine, for more than an unduly short time. The gold values in the deposits referred to are for the most part in an exceedingly finely divided and widely scattered condition and the particles are also, for the most part at least, associated with flour mercury. As it is apparently impractical, from the commercial standpoint, to treat the material by concentration before passing it through the amalgamator, it is necessary that the latter shall be, comparatively speaking, of large capacity, admitting the rapid passage through it of mixed ore and water in substantial volume. For the purpose of recovering the highest possible percentage of the values in these deposits and doing so in the most expeditious and economical manner, I have deemed it necessary, or at least desirable, to provide the apparatus with amalgamating plates so arranged as to deflect or obstruct, but not materially to choke, the flow through the apparatus; to provide means for agitating the mixture during its passage to maintain the heavier solids in suspension; to so dispose the plates that substantially all the solids in the mixture will at one time or another contact with an amalgamating surface; to provide means for maintaining the mercury coated surfaces of the plates in a healthy condition; and to so construct the various features of the apparatus as to admit of its substantially continuous operation.

In the accompanying drawings which show my improved apparatus equipped with the said desirable features in operative form and relation—Figure 1 is a broken longitudinal section of the apparatus taken on irregular line 1 in Fig. 4; Fig. 2, an enlarged broken section taken on line 2 in Fig. 4 and showing plate-scraping mechanism; Fig. 3, an enlarged broken view taken from line 3 in Fig. 4 and showing a detail of the scraper-operating mechanism; Fig. 4, a cross-section taken on line 4 in Fig. 1; and Fig. 5, an enlarged fragmentary section on the same line as Fig. 4, illustrating a means for introducing lumps of sodium amalgam, or the like reagent, into the body of mercury for the purpose of maintaining the latter in a suitably healthy condition.

The body of the apparatus is in the form of a sluice-box having side-walls 10 and 11, and a base 12 having transverse slots or openings 13 communicating with wells 14. The base 12 may be horizontal as illustrated, or substantially so, and the body or sluice has an inlet chute 15 at one end and an outlet chute 16 at the other end. In practice there may be as many wells 14, as desired, and they are maintained filled with mercury which reaches to the level of the dotted line 17. On the base between the wells are cross-extending ribs or shallow partitions 18, extending to the mercury level 17; and beyond the last well is a similar rib 19 beyond which is provided a cross-extending mercury trap 20 between which and the chute 16 is a somewhat higher cross-extending rib or partition 21. The numeral 22 indicates a drive-shaft carrying a pair of eccentrics 23 and a pair of cams 24 at each well; and extending parallel with the shaft 22 is a stationary bearing-shaft 25. At each well is a pair of amalgamating plates 26, movable at opposite edges in vertical guides 27 on the side-walls of the body and end-walls of the wells. Pivotally connected with the eccentric-ring of each eccentric 23 is a lever 28 fulcrumed upon the shaft 25 and extending at its long arm to a point substantially midway between the walls 10, 11. At each of the guides 27 is a vertically reciprocating support or frame having a top bar 29, legs 30, and arms 31 carrying guide-rods 32 which move in vertical guides formed by perforated ears 33 on the side-walls. Each lever 28 carries a pivotally-supported head 34 provided with upper and lower rollers 35 embracing the bar 29. The current obstructing amalgamating plates 26, are preferably, though not necessarily, formed with openings 36, the openings of adjacent plates at a well being in staggered relation, as represented for purposes of illustration by the full and dotted lines in Fig. 4. The legs 30 terminate in feet 37 slotted to receive the upper edges of the plates 26 which are removably fastened in the slots by means of pins or thumb-screws 38 passing through openings 39 in the feet and coincident openings in the plates. Forward of each well 14 is a rotary agitator 40 on a shaft 41 passing through the sides 10, 11, and driven by means of a sprocket-wheel 42 in a common manner. Also forward of each well is a cross-extending, perforated air conducting pipe 43, which in practice would be connected with a compressed air-supplier. Both of the attachments 40 and 43 are located above the mercury bath level and are for the purpose of agitating the ore and water passing through the apparatus to maintain the solids in suspension. Both types of agitators are shown more especially for illustration, though in practice either one will suffice. The eccentrics 23 are so positioned upon the shaft 22, with relation to each other, that the individual plates 26 of each set will move relatively in opposite directions and only two of the plates in the apparatus will be at the opposite limits of their traverse at the same time.

In operation, the mixed ore and water may be fed through the chute 15 to maintain a depth thereof in the apparatus well above the agitators. The shaft 22 is rotated at slow speed, which may be at the rate of one revolution in several minutes, and the plates are thus reciprocated in their guides between the high and low limits indicated. As the plates are lowered they become immersed in the baths of fresh mercury contained in the wells 14, and in rising they cross the path of the material. As many plates or sets of plates, and wells therefor, may be provided in the apparatus as desired for the purpose of causing all or approximately all of the solids in the mixture to contact with an amalgamating surface at one time or another. Any of the amalgamable values thus brought into contact with healthy mercury at the bath surface or on the plates will be amalgamated thereby. The agitators keep the solid particles in constant suspension and in constant movement with relation to each other, so that there is no well defined path that any portion of the current will follow. At opposite sides of the path of each plate I provide scraping or wiping mechanism to periodically remove from the faces of the plates any material, present in the ore, which may adhere to and befoul or incrustate the mercury coating on the plates. The scrapers consist of pairs of rock-shafts 44, located at opposite sides of the path of each plate and journaled in bearings provided in the side-walls 10, 11. Between the said walls the shafts are slotted longitudinally to receive strips 45, which may be of rubber or other suitable material, the strips being adjustable in the holders formed by the shafts 44 to take up wear. Extending through the shafts are screws 46 for tightening the opposite sides of the shafts against the strips 45 and thus clamp them in adjusted position. Each pair of shafts 44 is provided beyond the side-wall 10 with crank-arms 47 having logitudinal slots 48 at which they cross and pivotally engage the pin 49 on a vertically reciprocating rod 50. Each rod 50 passes through a guide 51 on the wall 10, and at its upper end carries a roller 52 engaging the respective cam 24. A spring 53 confined between the guide 51 and a collar 54 on each rod tends to maintain the latter raised against the cam 24. The parts are so adjusted with relation to each other that as a plate 26 starts to move in the downward direction, the adjacent rod 50 is engaged by the respective cam 24 and pressed in the downward direction against the resistance of its spring 53 to move the scrapers into contact with the opposite surfaces of the plate as indicated in Fig. 2. The scrapers thus operate during the downward movement of the plate to wipe off all the incrusting material as well as more or less of the mercury and amalgamated values adhering to the plate, the scrapings falling into the mercury bath. The lighter material thus scraped off will be carried along by the current while the amalgamated values will sink into the mercury bath. The immersion of a plate 26 in a well 14 causes it to be recoated with fresh mercury and when the plate starts to rise the rod 50 is released by the cam 24 and raised by its spring 53, thus causing the wipers to be turned to the position indicated by dotted lines in Fig. 2, out of contact with the plate so as not to wipe off any of the fresh mercury. The passage of the ore through the apparatus tends to sicken or befoul the mercury bath, largely by reason of the fact that the native mercury content of the ore is impure when amalgamated by the plate and bath surfaces. This makes it necessary or at least desirable to freshen or rejuvenate the mercury bath by introducing into it a suitable reagent, such as sodium, preferably in the form of sodium amalgam. It is considered preferable to introduce the sodium amalgam into the lower part of the mercury bath and, as an expedient for accomplishing this purpose, I provide at each well means, as illustrated in Figs. 4 and 5, for introducing lumps or pellets of sodium amalgam. The means shown consists of a solid cylinder 55 provided midway between its ends with an open pocket 56. The cylinder may be moved longitudinally and axially by means of a handle 57 and passes through a stuffing-box 58 in the end-wall of the well. A shoulder 59 holds the cylinder against complete withdrawal. From time to time, during the operation of the apparatus, pieces of sodium amalgam may be dropped into the pocket 56 and the cylinder forced inward and turned, if necessary, to deposit the pieces in the bath. When the handle 57 is released, the pressure of the mercury in the bath will force the cylinder back to the initial position shown. Any mercury and associated material carried out of the bath by the pocket 56 may be emptied into a suitable receptacle and saved. As the bath rises by the addition thereto of amalgamable values and native mercury, it will overflow the partitions 18, 19, and be caught in the trap 20; the partition 21 operating to aid in holding back heavier materials and preventing loss of mercury by escape to the chute 16.

In the base of each well is a draw-off opening 60 having a suitable valve or removable plug 61, whereby the wells may be emptied of their contents when desired. The plates 26 may be readily removed from and replaced in their holders 37, so that when it is desired to remove a plate for the purpose of cleaning it or otherwise, this may be done while the holder is in its raised position and without stopping the apparatus. By providing the apparatus with the proper number of wells and plates, there is little danger that any, or more than a very small percentage, of the values will escape amalgamation, even when it is run continuously at full capacity.

Various changes may be made in details of construction and combinations of parts to adapt, or better adapt, the apparatus for the treatment by amalgamation of different ores, without departing from the spirit of my invention as defined by the claims. The foregoing description is intended only to convey a clear understanding of my improvements in what I now believe to be the best form of their embodiment, and no undue limitation should be understood therefrom.

What I claim as new and desire to secure by Letters Patent is—

1. In an amalgamating apparatus, the combination with a sluice and means for directing a current of ore and water therethrough, of a mercury bath in the lower part of the sluice, a power actuated reciprocating-support above the bath, an amalgamating plate connected with said support to be moved thereby into and out of said bath across the path of said current, and a surface scraper for the plate with which it contacts in its movement, for the purpose set forth.

2. In an amalgamating apparatus, the combination with a sluice and means for directing a current of ore and water therethrough, of a mercury bath in the lower part of the sluice, a series of power-actuated reciprocating supports disposed along the sluice above the bath and occupying different levels with relation to each other during movement, and an amalgamating plate detachably connected with each support to be moved thereby into and out of said bath across the path of said current, for the purpose set forth.

3. In an amalgamating apparatus, the combination with a sluice and means for directing a current of ore and water therethrough, of a mercury bath in the lower part of the sluice, a series of power-actuated reciprocating-supports disposed along the sluice above the bath and occupying different levels with relation to each other during movement, and a perforated amalgamating plate connected with each support to be moved thereby into and out of said bath across the path of said current, the perforations in adjacent plates being always in staggered relation, for the purpose set forth.

4. In an amalgamating apparatus, the combination with a sluice and means for directing a current of ore and water therethrough, of a power device, a mercury-containing well in the sluice, an amalgamating plate operatively connected with the power device to be reciprocated thereby across the current into and out of said well, and a surface-scraper operatively connected with the power device to be pressed against the plate in the downward movement of the latter and release the plate in the upward movement thereof.

5. In an amalgamating apparatus, the combination with a sluice and means for directing a current of ore and water therethrough, of a power device, a mercury-containing well in the sluice, an amalgamating plate operatively connected with the power device to be reciprocated thereby across the current into and out of said well, and a pair of surface-scrapers operatively connected with the power device to be pressed against opposite surfaces of said plate in the downward movement of the latter, and released from said plate in the upward movement thereof.

THOMAS J. LOVETT.

In presence of—
R. A. RAYMOND,
OTTILY C. AVISEES.